Patented Mar. 9, 1948

2,437,564

UNITED STATES PATENT OFFICE 2,437,564

COMPOUNDS WITH CORTINLIKE EFFECT AND INTERMEDIATES THEREOF AND A METHOD OF PRODUCING THE SAME

Arthur Serini, Berlin N. 65, and Willy Logemann, Berlin-Charlottenburg, Germany, assignors to Schering Corporation, Bloomfield, N. J., a corporation of New Jersey No Drawing. Application June 14, 1938, Serial No. 213,630. In Germany June 14, 1937

18 Claims. (Cl. 260—397.4)

This invention relates to a process for the manufacture of compounds with cortin-like effect and intermediate products in the production thereof, and a method of producing the same.

The compounds which are produced according to the invention are characterised by belonging to the pregnane series, the cyclopentane ring containing a side chain with the grouping —CO—CH₂OH which can also be of the enol-form C(OR)=CH.OR wherein R is an acid residue or a hydrocarbon residue as for instance alkyl, aryl etc.; the more or less hydrogenated phenanthrene system contains two methyl groups as substituents, a hydroxyl group or an oxygen atom on the C-atom 3 of the ring A and if desired further hydroxyl or substituted hydroxyl or oxygen substituents. As examples of the compounds according to the present invention the following formulas may be given:

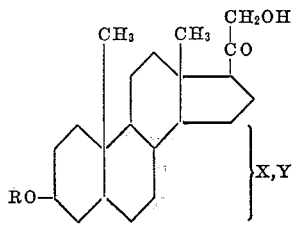

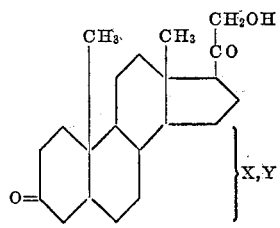

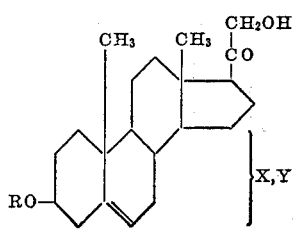

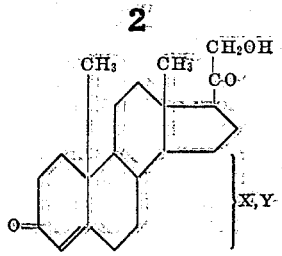

In these R indicates hydrogen or an acyl group or a hydrocarbon residue as alkyl, aryl etc. and X and Y hydrogen, oxygen, a hydroxyl or substituted hydroxyl group or such a group as by saponification can be converted into a hydroxyl group, these substituents being located on any C-atom of the ring system. Thus X, Y may indicate

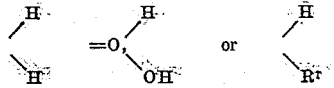

in which R′ is a group convertible into the hydroxyl group by hydrolysis.

According to one feature of the present invention the manufacture of such compounds takes place in such a manner that in the first place compounds of the pregnane series saturated or unsaturated in the ring system and with unsaturated side chain on the carbon atom 17 of the following contribution:

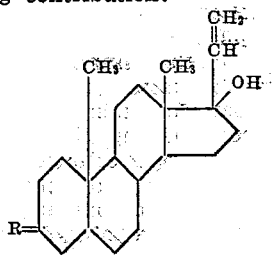

in which R indicates $$=O\diagdown_{OH}^{H}$$

or a group transformable thereinto, that is,

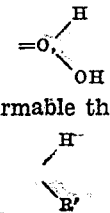

wherein R' is an acid or an ether residue, are subjected to the action of agents adding on oxygen, in particular per benzoic or per phthalic acids. If a further double bond is present in the ring system and an attachment of oxygen or hydroxyl groups is not desired in that position, it is to be recommended to protect this double bond in the customary manner, for example by attachment of halogen, halogen hydride and the like.

On the compounds thus produced containing an ethylene oxide ring, hydrolysing agents are now allowed to act.

According to a further feature of the invention it is also possible to proceed directly from the vinyl compounds and to convert these immediately into the glycol-like compounds in such a manner that there are allowed to react thereon for example hydrogen peroxide, per-acetic acid in glacial acetic acid solution or similar agents as for example osmium tetroxide, which are to be considered as suitable for the attachment of two hydroxyl groups to carbon-carbon double bonds. In the case of the application of osmium tetroxide the osmium ester formed is decomposed in the manner known per se by treatment with reducing agents for example with sodium sulphite and in this manner the corresponding compound containing two more hydroxyl groups obtained.

Also in these cases it is to be recommended, if a further double bond is present in the ring system at which an attachment of hydroxyl groups is intended to be avoided, to protect the nuclear double bond in the customary manner described above.

In case there is a keto-group in 3-position and osmium-tetroxide is employed as agent adding an oxygen, the protection of the double-bond in 4,5-position is not necessary as then the addition of the hydroxyl groups only takes place in the side chain as for example in the case of 17-vinyl-androsten-ol-17-one-3.

It is also possible for example to add on hypochlorous acid and to replace the halogen by hydroxyl.

These compounds are therefore substituted in the cyclopentane ring in the following manner:

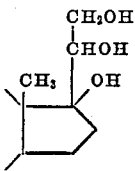

These glycerol derivatives are now subjected to a process for splitting off of water in which advantage is taken of the lesser stability of the tertiary hydroxyl; for instance by increase of temperature, for example heating in vacuum, or by addition of agents splitting off water, as for example dehydrated copper sulfate, mineral acids, formic acid and the like, or by both methods, the splitting off is effected of only one molecule of water; by this means the polyhydric alcohols are converted into ketone alcohols of the following structure:

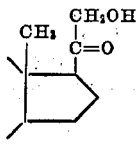

The reaction methods here set out by way of example may be illustrated in more detail by the following formulas:

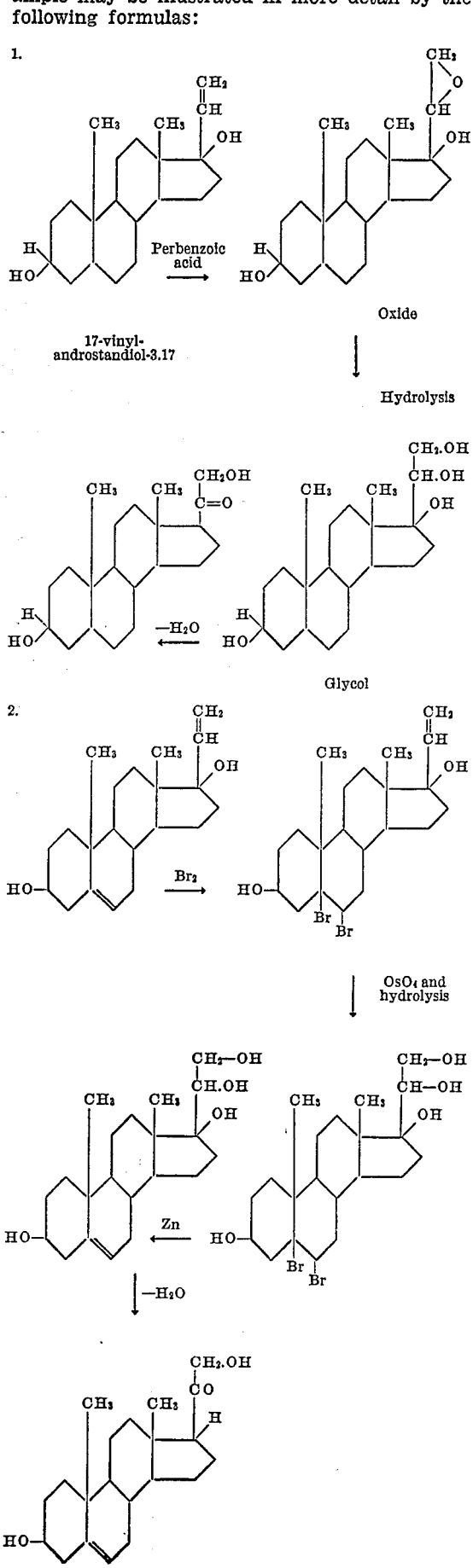

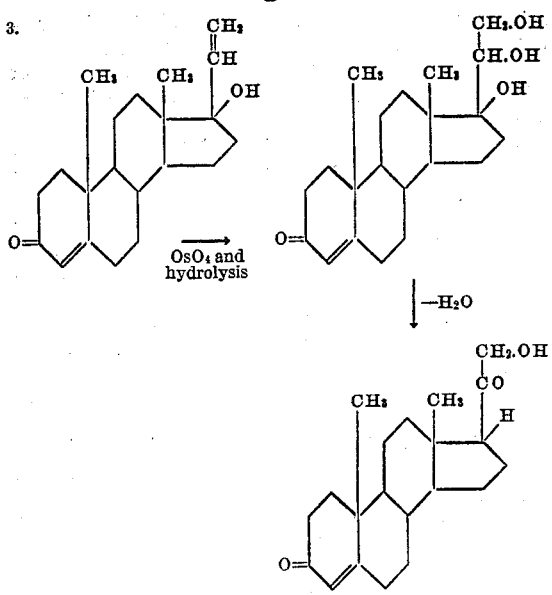

The above indicated starting materials can contain in the ring system further hydroxyl or substituted hydroxyl groups or oxygen substituents. They can be of any desired origin; for example they can have been obtained by partial hydrogenation of the corresponding triply unsaturated compounds as are obtained when acetylene is allowed to react on 17-keto-aetiocholane in the presence of alkali metal, which process forms the subject of specification No. 111,363, filed November 18, 1936, now Patent 2,251,939, dated August 12, 1941. The compounds can however also be obtained directly from the corresponding aetiocholane compounds when for example according to the process of patent No. 2,243,887, issued June 3, 1941, 17-keto-aetiocholanes are allowed to react with unsaturated metal organic compounds.

Under the expression "compounds of the aetiocholanes series" are intended to be understood in the present case the compounds of the actual aetiocholane series saturated and unsaturated as regards the ring system and also those of the so-called aetio-allocholane series.

To the vinyl compounds obtainable according to the above patents, for example 17-vinyl-androstandiol-3.17, in a suitable solvent for example chloroform, is added an excess of the oxidizing agent for example perbenzoic acid in chloroform; after the reaction components have been allowed to react upon one another for a long time the reaction mixture is worked up in the customary manner; there is then obtained a compound containing one oxygen atom more, the oxide of a 17-vinyl-androstandiol-3.17.

If a 17-vinyl-androstandiol-3.17 is employed as starting material there can be isolated from the reaction mixture a compound richer by two oxygen atoms, which may be designated as dioxide of a 17-vinyl-androstendiol-3.17 and in which in addition to the oxygen bridge in the side chain on the carbon atom 17 there is also an oxygen bridge contained in the ring system.

If, on the other hand, the ring double bond is protected in a suitable manner, for example by attachment of halogen, as by the addition of bromine or halogen hydride, then also in this case a compound richer by only one oxygen atom is obtained, the intermediate in the case of the addition of bromine being the oxide of 17-vinyl-dibromo-(5,6)-androstandiol-3.17; the oxidation product can then be dehalogenated in the customary manner, for example by means of zinc dust, whereby the unsaturated compound is produced.

If there are employed as starting materials for the manufacture of the glycol-like compounds such oxides of vinyl compounds as contain in addition to the oxygen bridge in the side chain on the carbon atom 17 also an oxygen bridge in the ring system, or such vinyl compounds as contain a carbon-carbon-double bond in the ring system, then in carrying out the process according to the present invention products with two glycol groups in the molecule can be obtained.

A hydroxyl group present in the ring system for example in 3-position can during the process be converted for example by oxidation into a keto-group.

The following examples illustrate the invention:

Example 1

1.6 grams of 3.17-dihydroxy-17-ethanyl-androstane are treated in 30 ccm. dioxane with 1.5 grams of osmium tetroxide. After a few hours a fine black precipitate is deposited which after 2 days is filtered off. This filtered osmium ester is heated in aqueous alcoholic solution with sodium sulphite for 1 hour under reflux. The whole is filtered and the precipitate boiled with alcohol. The alcoholic filtrates are concentrated in vacuum and the residue is extracted several times with ether and chloroform. These extracts washed several times with water and concentrated in a vacuum. Thus the 3.17.20.21-tetrahydroxyallopregnane is obtained. It can be further purified by recrystallization from acetic ether and has a M. P. 230–232°. From the mother liquors can be isolated 3.17-dihydroxy-17-aldehydoandrostane which has been produced by rupture of the ethenyl-double bond.

Example 2

3.69 grams of 3.17-dihydroxy-17-ethenyl-androstane are dissolved in chloroform and after the addition of 7 grams of phthalic mono-per-acid in 90 cc. of chloroform, allowed to stand in the dark at room temperature. After this time the theoretical quantity of 2.1 grams of per-acid has been consumed. The product is now taken up in ether and the ether washed with dilute alkali. After evaporation of the ether the residue is recrystallized from dilute methanol. The yield amounts to 2.6 grams of the corresponding oxide of M. P. 182° C.

Example 3

0.2 gram of 3.17-dihydroxy-17-ethylene-oxide-androstane are heated with 4 cc. of water for 20 hours in a bomb tube to 190–200° C. The reaction product is taken up in ether, the ether dried and for the most part evaporated. During the evaporation there separates the glycol produced which is filtered off. It can be purified by recrystallization from ether or from methanol-ether.

Example 4

1.1 grams of 17-ethenyl-3.17-dihydroxy-androstene (5,6) are dissolved in 100 cc. of carbon tetrachloride and 200 cc. of ether. To the solution is added in the course of 60 minutes 0.5687 gram of bromine (2 atoms) dissolved in 26 cc. of carbon tetrachloride at a temperature of 0–5° C. After the addition of 1 gram of osmium tetroxide the reaction mixture is allowed to stand for 4 days. After this time the precipitate is filtered with suction. The yield amounts to 2 grams. The precipitate is heated to boiling in 300 cc. of ethanol with 8 grams of zinc dust for 1 hour. Then the whole is filtered from zinc dust and the filtrate after the addition of an aqueous-alcoholic sodium sulphite solution boiled for a further 2 hours. When filtration is effected and the filtrate extracted with ether. The ether is washed with water, dried and the residue obtained after evaporation of the ether recrystallized from ethyl acetate. The $\Delta_{5,6}$-pregnentetrol-(3.17.20.21) melts at 229° C.

*Example 5*

2 grams of $\Delta_{4,5}$-17-ethenyl-androstenol-17-one-3 are dissolved in 300 cc. of ether and treated with 1 mol (1.63 grams) of osmium tetroxide. After a short time the olive green osmium ester is precipitated. After 2 days standing the whole is filtered and the osmium ester split up. For this purpose the ester is heated with 5 grams of sodium sulphite in 42 cc. of water and 170 cc. of alcohol for 2 hours to boiling. The mother liquor from the separated sodium osmium sulphite is concentrated in vacuum and the residue extracted with ether several times. The residue obtained after evaporation of the ether yields the $\Delta_{4,5}$-pregnentriol-(17.20.21)-one-3 which when recrystallized from ethyl acetate melts at 232° C.

*Example 6*

80 mg. of $\Delta_{4,5}$-pregnentriol-(17.20.21)-one-3 are heated for 2 hours under reflux in 10 cc. of dioxane and 4 cc. of aqueous sulphuric acid. Then the whole is taken up in much ether and the ether washed with water and bicarbonate solution. The residue obtained after evaporation of the ether is ground with ether. The undissolved residue consists of unchanged starting material. The mother liquor is again evaporated and thereupon ground with a little acetone. Crystals separate which after further recrystallization from acetone melt at 138° C. The substance is fully active in the test on a cat having no suprarenal capsule.

The term "pregnane compound" as used in the appended claims is to be understood in its generic sense as including the nuclearly unsaturated as well as the nuclearly saturated cyclopentano polyhydro phenanthrene compounds of the $C_{21}$ series.

Having now particularly described and ascertained the nature of our said invention and in what manner the same is to be performed, we declare that what we claim is:

1. Process for the manufacture of 21-oxy-compounds of the pregnane series wherein pregnane compounds, which contain between the carbon atoms 20 and 21 an ethylene bond and on the carbon atom 17 a hydroxyl group, are converted with the aid of agents adding on an oxygen-containing group, followed by hydrolysis, into compounds of glycerol-like structure containing hydroxyl groups on the carbon atoms 17, 20 and 21, and from the latter water is split off.

2. Process as claimed in claim 1 in which as starting material 17-vinyl-androstandiol-3.17 is employed.

3. Process as claimed in claim 1 in which as starting material 17-vinyl-5.6-dibromo-androstandiol-3.17 is employed and in which the bromine is removed from the intermediate dibromotetrol prior to the splitting off of water.

4. Process as claimed in claim 1 in which as starting material 17-vinyl-androstenol-17-one-3 is employed.

5. Process as claimed in claim 1 in which as the agent adding on an oxygen-containing group a per-acid is employed.

6. Process as claimed in claim 1 in which the oxidizing agent is a member of the group consisting of per-acids hydrogen peroxide and osmium tetroxide.

7. In a process for the manufacture of 21-oxy-compounds of the pregnane series, the step which comprises splitting off water from a pregnane compound containing hydroxyl groups on the C-atoms 17, 20 and 21.

8. Process as claimed in claim 7, in which the splitting off of water is effected by increase of temperature.

9. Process as claimed in claim 7, in which the splitting off of water is effected with the aid of a member of the group consisting of dehydrated copper sulfate, mineral acids, and formic acid.

10. Process for the manufacture of compounds of the cyclopentanopolyhydrophenanthrene series wherein a pregnane compound unsaturated in the ring system, which contains between the carbon atoms 20 and 21 an ethylene bond and on the carbon atom 17 a hydroxyl group, is converted by attachment of a member of the group consisting of halogen and halogen hydride to the ring double bond into the corresponding halogen-containing compound and then reacted with an oxidizing agent acting to add on an oxygen-containing group at the 20,21-carbons.

11. Process as claimed in claim 10, in which the halogen-containing and oxygenated compound is dehalogenated and hydrolyzed in either order.

12. Pregnentriol-(17,20,21)-one-3, the double bond being located between the 5-carbon and an adjacent carbon.

13. A process for the manufacture of oxygenated compounds of the saturated and unsaturated pregnane series, comprising subjecting a pregnane compound, in which the 20-carbon atom is linked by a double bond to the immediately adjacent carbon atom, to the action of an oxidizing agent capable of adding an oxygen-containing group onto said double bond hydrolyzing the product to the glycol, and treating the latter with an agent capable of splitting the elements of water from the two hydroxyl groups so formed.

14. A process for the manufacture of oxygenated compounds of the saturated and unsaturated pregnane series, comprising subjecting a pregnane compound, in which the 20-carbon atom is linked by a double bond to the immediately adjacent carbon atom, to the action of an oxidizing agent capable of adding an oxygen-containing group onto said double bond, reacting the product with a hydrolyzing agent, and treating the polyhydroxy compound so obtained with an agent capable of splitting the elements of water from the two hydroxyl groups formed by the hydrolysis.

15. As new compositions cyclopentano-dimethyl-polyhydrophenanthrene derivatives having at the carbon atom $C_{17}$ both hydroxyl and a side chain of the form $CHOH-CH_2OH$ and having at the carbon atom $C_3$ a substituent from the class consisting of hydroxyl, acyloxyl, alkoxyl and keto.

16. A pregnenolone compound of the formula

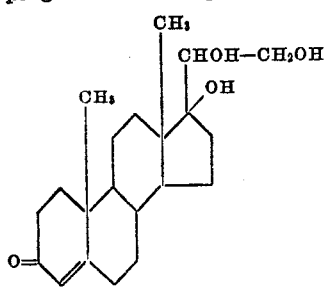

17. Process for the manufacture of cyclopentanopolyhydrophenanthrene compounds of the $C_{21}$ series, which comprises reacting an unsaturated 3-keto cyclopentanopolyhydrophenanthrene compound of the $C_{21}$ series and having an ethylene bond between the carbon atoms 20 and 21 and a hydroxyl group on the carbon atom 17 with an oxidizing agent capable of adding on an oxygen-containing group at the double bond and thereby saturating such double bond, and thereafter hydrolyzing the oxygenated compound so obtained to produce a substituted glycerol having hydroxyl groups on the carbon atom-17, 20 and 21.

18. Process for the manufacture of cyclopentanopolyhydrophenanthrene compounds of the $C_{21}$ series, which comprises reacting a cyclopentanopolyhydrophenanthrene compound of the $C_{21}$ series having an ethylene bond between the carbon atoms-20 and 21, and a hydroxyl group on the carbon atom-17 with an oxidizing agent capable of adding on an oxygen-containing group at the double bond and thereby saturating such double bond.

ARTHUR SERINI.
WILLY LOGEMANN.

REFERENCES CITED

The following references are of record in the file of this patent:

UNITED STATES PATENTS

| Number | Name | Date |
|---|---|---|
| 2,312,344 | Logemann | Mar. 2, 1943 |